United States Patent
Miyai et al.

[11] Patent Number: 5,825,793
[45] Date of Patent: Oct. 20, 1998

[54] LASER AND LASER APPLIED UNITS

[75] Inventors: Tsuyoshi Miyai; Satoshi Makio, both of Saitama; Yasunori Furukawa, Ibaragi; Masayoshi Sato, Saitama, all of Japan

[73] Assignee: Hitachi Metals, Ltd., Tokyo, Japan

[21] Appl. No.: 656,875

[22] Filed: May 30, 1996

[30] Foreign Application Priority Data

Jun. 5, 1995 [JP] Japan ................................. 7-137608
Apr. 4, 1996 [JP] Japan ................................. 8-082785

[51] Int. Cl.⁶ .................. H01S 3/00; H01S 3/13; H01S 3/10; H01S 3/04
[52] U.S. Cl. .................. 372/33; 372/29; 372/21; 372/34; 372/105
[58] Field of Search ................. 372/29, 31, 32, 372/34, 21, 75, 105, 20, 98, 22, 33

[56] References Cited

U.S. PATENT DOCUMENTS

| | | |
|---|---|---|
| 4,811,349 | 3/1989 | Payne et al. ................. 372/41 |
| 5,038,352 | 8/1991 | Lenth et al. ................. 372/21 |
| 5,038,360 | 8/1991 | Negus et al. ................. 372/105 |
| 5,093,832 | 3/1992 | Bethune et al. ................. 372/21 |
| 5,249,189 | 9/1993 | Scheps ................. 372/20 |
| 5,303,250 | 4/1994 | Masuda et al. ................. 372/21 |
| 5,317,447 | 5/1994 | Baird et al. ................. 372/21 |
| 5,383,209 | 1/1995 | Hwang ................. 372/21 |
| 5,583,882 | 12/1996 | Miyai et al. ................. 372/21 |

*Primary Examiner*—Rodney B. Bovernick
*Assistant Examiner*—Quyen Phan Leung
*Attorney, Agent, or Firm*—Staas & Halsey

[57] ABSTRACT

A laser having, a resonator structure including a wavelength variable laser crystal containing a fluoride and an optical part for controlling the wavelength of radiation from the laser crystal, a device to excite the laser crystal, a device for detect reflected light from the optical part as a sample beam, and a device to stabilize the output of a laser beam from the resonator structure based on the sample beam.

19 Claims, 7 Drawing Sheets

LASER AND LASER APPLIED UNITS

BACKGROUND OF THE INVENTION

1. Field of the Invention

This invention relates to an optoelectronic field and, more specifically, to a laser for use in a laser printer, optical shaping unit, optical recorder, particle counter and the like.

2. Related Art

With the progress of the advanced information communication age, demand for adaptation to short wavelengths is arising to meet requirements for improved recording density and high-speed printing in computer peripheral laser applied units such as optical disk drives and laser printers. However, as light sources capable of providing a blue color range which is in high demand for commercialization, only gas lasers such as He-Cd (helium-cadmium) and Ar (argon) lasers are available. However, they are not put to practical use yet because they have such problems as large size, large power consumption and short service life due to gas deterioration in a plasma tube. A laser applied unit which incorporates a bulky laser as a light source needs to be larger in size than at least the laser and inevitably becomes bulky. Therefore, they cannot be adapted for use in office environment and housing environment where equipment is mainly of a desk top size. Further, since a laser has low conversion efficiency from input power to laser light and most of consumed power turns into heat, cooling means is required with the result that a laser applied unit becomes more bulky. There is another problem that the displacement of an optical system caused by the vibration of this cooling means deteriorates the reliability of a laser applied unit.

To cope with the above problems, there has been proposed an intracavity SHG (Second Harmonic Generation) system, one of wavelength conversion systems making use of a first laser beam generated by a Ti: $Al_2O_3$ (titanium added sapphire; Ti-Sap.) crystal which is a laser crystal capable of oscillating at a wavelength range of 800 to 900 nm or a Cr: $LiSrAlF_6$ crystal (to be referred to as "LiSAF crystal" hereinafter, a laser using this LiSAF crystal is called "LiSAF laser") which is a laser crystal containing a fluoride (former; L. S. Wu, H. Looser, and P. Gunter, "High-efficiency intracavity frequency doubling of Ti: $Al_2O_3$ lasers with $KNbO_3$ crystals", Appl. Phys. Lett., Vol.56, No.22, p.2163 (1990), and latter; F. Balembois, P. Georges, F. Salin, G. Roger, and A. Brun, "Tunable blue light source by intracavity frequency doubling of a Cr-dope $LiSrAlF_6$ laser", Appl. Phys. Lett., Vol.61, No.20, p.2381 (1992)). As an excitation light source, the former system uses a Q switch YAG SHG laser (wavelength; 532 nm) and the latter uses a Kr laser (wavelength; 647, 676 nm), both of which are bulky, consume large power and have a short service life. Therefore, they do not improve the problems of the above gas lasers. Since both systems output pulses and not continuous waves, they have a problem in practical application.

In contrast to these, it has already been disclosed that an LiSAF crystal can be excited by a red semiconductor laser having a wavelength of 670 nm (R. Scheps, J. F. Myers, H. B. Serreze, A. Rosenberg, R. C. Morris, and M. Long, "Diode-pumped Cr: $LiSrAlF_6$ laser", Opt. Lett., Vol.16, No.11, p.820 (1991)).

Out of the above LiSAF laser and Ti-Sap. laser, a laser using a LiSAF crystal which is a fluoride-containing laser crystal can be excited by a semiconductor laser, and it is anticipated that an SHG laser, one of the wavelength conversion systems of a semiconductor laser excited LiSAF laser has the possibility of greatly improving the problems of the conventional gas lasers in size, power consumption and service life.

The inventors of the present invention have developed a second harmonic generation apparatus which improves SHG conversion efficiency by using an LiSAF crystal as a semiconductor laser excited wavelength variable solid laser crystal and by controlling the wavelength of a laser beam generated from the LiSAF crystal using a birefringence crystal as a wavelength control element.

However, the apparatus has such a problem that the output of a semiconductor laser excited LiSAF laser or a wavelength conversion laser such as an SHG using an LISAF crystal is unstable.

Generally speaking, short-term factors for causing fluctuations in the output of a solid laser include relative vibrations of optical parts constituting a laser resonator, fluctuations in temperature distribution in a laser crystal, fluctuations in excitation light, i.e., solid laser output, competitive and relaxation oscillation between longitudinal modes of laser output, changes in the effective optical path lengths of optical parts caused by temperature variations, and the like. Long-term factors include a reduction in the output of excitation light caused by the deterioration of an excitation light source, the deterioration of a mirror, the deterioration of reflection prevention films of optical parts, and the like. In the case of a wavelength conversion laser such as an SHG, a possible factor is changes in phase matching wavelength caused by temperature variations in a nonlinear optical crystal which is an SHG crystal.

Out of these factors, competitive and relaxation oscillation between longitudinal modes of laser output is one of main factors for causing fluctuations in the output of a wavelength conversion laser such as an LiSAF laser and an SHG using an LiSAF laser. That is, since an LiSAF laser has a wide gain bandwidth of 220 nm from 780 to 1,000 nm, when it has no control unit, it oscillates in a longitudinal multi-mode with a broad band of 10 nm (Shinichiro Aoshima, Haruyasu Itoh, Yasushi obayashi, Isuke Hirano, "Cr: LiSAF laser", Optical and quantum device research association material, OQD-92-13 (1992)). Therefore, a competition between longitudinal modes occurs and output noise is generated. As one of means for reducing mode competitive noise, an optical part having a wavelength control function is used to reduce the number of longitudinal modes to one.

FIG. 7 is a diagram for explaining means for measuring the relationship between the bandwidth of a longitudinal mode in a LiSAF laser and the power of the oscillation beam of the LiSAF laser. A birefringence filter 23 made of quartz is used as a wavelength control element. Generally speaking, the wavelength dependence of the transmittance of the birefringence filter 23 changes according to the thickness of the filter, i.e., the larger the thickness the sharper the peak of the transmittance becomes. When a plurality of birefringence filters 23 are stacked one upon another, the transmittance is the product of the transmittances of the filters. The thicknesses of the birefringence filters are 0.5, 1.0 and 1.5 mm. A resonator 20 is formed between an input mirror 24 on the end surface of an LiSAF crystal 21 and an output mirror 25 which is a concave mirror and excitation light from a semiconductor laser 11 for excitation passes through a converging optics 12 and converged in the LiSAF crystal 21 from the same optical axis as that of the resonator 20. The curvature of the output mirror 25 which is a concave mirror is 15 cm, and the length of the resonator is slightly shorter than the curvature radius and has a hemispherical relationship with the curvature radius. The output mirror 25 and the resonator 20 are positioned like an hemisphere. Light is radiated from the LiSAF crystal 21 with excitation light from the semiconductor laser 11, a first laser beam 32 oscillated in the resonator 20 is separated by a half mirror 26, and output and wavelength are measured at the same time. Measurements were made by changing a combination of the birefringence filters 23.

Table 1 shows the measurement results of the relationship between the bandwidth of a longitudinal mode and the power of the first laser beam in the LiSAF laser when the combination of the birefringence filters was changed.

TABLE 1

| combination of birefringence filters | bandwidth (nm) | power of laser (relative value) |
|---|---|---|
| 0.5 mm/one | 1.5 | 1 |
| 0.5 and 1.0 mm/two | 0.5 | 0.5 |
| 0.5, 1.0 and 1.5 mm/three | 0.2 | 0.1 |

It is understood from Table 1 that the bandwidth could be reduced to 0.2 nm by combining three birefringence filters compared with the bandwidth of about 4 nm when no birefringence filter was used. However, the power of the first laser beam was reduced by a factor of $1/10$. To realize a single longitudinal mode, it is necessary to combine a large number of wavelength control elements and a further reduction in the power of the first laser beam is expected. That is, when a semiconductor laser having limited output is used, it seems to be substantially difficult to achieve a single longitudinal mode. Since the conversion efficiency of a nonlinear optical crystal used is dependent upon wavelength in a wavelength conversion laser such as an SHG using an LiSAF laser, the effect of the mode competitive noise of the first laser beam will be further expanded.

Out of the other factors described above, positively controllable factors include input of excitation light and the temperature of a laser crystal. In the case of a wavelength conversion laser such as an SHG, since the phase matching wavelength of a nonlinear optical crystal is dependent upon temperature, the temperature of the nonlinear optical crystal is added as another controllable factor. To eliminate this controllable factor, a feed-back control unit which makes use of a sample beam separated from laser output as shown in FIG. 7, for example, by a half mirror or the like to attenuate output fluctuations was considered. However, obtaining the sample beam results in a loss in the first laser beam or second laser beam output (to be referred to as "SH output" hereinafter), which is not preferred.

SUMMARY OF THE INVENTION

This invention has been made to solve the above problems.

It is therefore an object of the present invention to provide means for stabilizing laser output without generating a new loss in an LiSAF laser and a wavelength conversion laser such as an SHG using an LiSAF laser.

It is another object of the invention to improve the reliability of a laser which can obtain stable laser output.

It is a further object of the invention to reduce the number of parts for separating a beam.

The inventors have conducted intensive studies on the above problems. When a wavelength variable laser crystal such as an LiSAF crystal is used, it is necessary to control the wavelength of radiation from the crystal in the resonator. Wavelength control is intended to obtain light having a desired wavelength range by allowing light having the desired wavelength range to pass and reflecting light having the other wavelength ranges. The inventors have paid their attention to the fact that laser light having a wavelength range other than the transmission wavelength range of this wavelength control element becomes a loss as reflected light and have accomplished this invention.

In other words, the present invention is a laser which comprises a resonator structure including a wavelength variable laser crystal containing a fluoride and an optical part for controlling the wavelength of radiation from the laser crystal, means for exciting the laser crystal, means for detecting reflected light from the optical part as a sample beam and means for stabilizing the output of a laser beam from the resonator structure based on the sample beam.

FIGS. 8, 9 and 10 are diagrams for explaining how to obtain a sample beam for use in feed-back control. A birefringence filter or a prism is used as an optical part for controlling the wavelength of radiation from an LiSAF laser.

FIG. 8 shows the case where a birefringence filter 23 is used as the optical part for controlling wavelength. Radiation from the LiSAF crystal 21 excited by the semiconductor laser 11 is amplified by the resonator 20 to generate a first laser beam 32. The LiSAF crystal 21 is arranged such that an axis "c" is present within the paper and the plane of polarization is the same as that of the paper. In this respect, the birefringence filter 23 is arranged such that input and output surfaces thereof form a Brewster Angle with respect to the optical axis of the oscillation beam 32 to minimize a loss in the resonator. Although the reflections of input light and output light at the Brewster Angle are greatly reduced, they are slightly existent. Since the internal power of the first laser beam 32 is generally more than several watts, the first laser beam 32 of several micro-watts to several milli-watts is reflected on the input surface and output surface of the birefringence filter 23 so that the sample beam 34 can be obtained and detected by an unshown detector.

FIG. 9 shows a wavelength conversion laser which is an LiSAF laser using a nonlinear optical crystal. The plane of polarization of the first laser beam is also the same as that of the paper. In this respect, part of the first laser beam is converted into a second laser beam 33 by the nonlinear optical crystal 22. Since the second laser beam 33 has the plane of polarization perpendicular to the first laser beam, several percents to several tens of percents of the second laser beam 33 is reflected by the birefringence filter 23. Like the first laser beam shown in FIG. 8, part of the second laser beam is reflected and separated, and can be obtained as a sample beam 34 and detected by an unshown detector.

FIG. 10 shows the case where a prism 27 is used as an optical part for controlling wavelength. The plane of polarization is also the same as that of the paper. In this respect, the prism 27 is arranged such that the input surface and output surface of the prism form a Brewster Angle with respect to the optical axis of the oscillation beam like the birefringence filter 23. Therefore, when the first laser beam 32 forms a reflection Brewster Angle on the input and output surfaces of the prism 27, part of the oscillation beam 32 is reflected and separated, and can be obtained as a sample beam 34 and detected by an unshown detector in the prism 27 which is arranged at a Brewster Angle with respect to the optical axis in the resonator.

In the present invention, as described above, in an LiSAF laser or a wavelength conversion laser such as an SHG using an LiSAF laser, stable laser output can be obtained without a new loss by positively utilizing for feed-back control reflected light which is unavoidable due to wavelength control.

Further, the present invention proposes means for controlling the power of excitation light out of the above controllable factors as one of means for stabilizing laser output. That is, in a semiconductor laser for generating excitation light, use is made of such a phenomenon that the power of the semiconductor laser rises by increasing drive current with the result of a rise in the power of the first or second laser beam. As shown in FIGS. 8, 9 and 10, the first or second laser beam partly reflected and separated by the wavelength control means reaches the detector as a sample beam. Output from the detector for a certain sample beam is set as a reference voltage and the drive current of the semiconductor laser is adjusted so that an output voltage from the detector becomes equal to this reference voltage. With such constitution, stable laser output can be obtained.

The present invention also proposes means for controlling the temperature of a laser crystal out of the above controllable factors as another means for stabilizing laser output. That is, in an LiSAF laser, use is made of the fact that the power of the first or second laser beam is dependent on the temperature of a laser crystal. The temperature of the laser crystal 21 is adjusted so that a reference voltage for the intensity of a certain sample beam becomes equal to an output voltage from the detector.

Further, another means for stabilizing laser output according to the present invention controls the temperature of a nonlinear optical crystal out of the above controllable factors in a wavelength conversion laser which is an LiSAF laser. Laser output is stabilized by controlling the temperature of a nonlinear optical crystal, making use of the fact that SHG output is dependent upon the temperature of the nonlinear optical crystal. The temperature of the nonlinear optical crystal is adjusted so that a reference voltage becomes equal to an output voltage from the detector.

According to the present invention, a stable feed-back control system is effected without a new loss caused by obtaining part of output using a half mirror or the like.

Stable laser output can be obtained by using this laser in laser applied units such as a laser printer, optical shaping unit, optical recorder and particle counter.

DETAILED DESCRIPTION OF THE PREFERRED EMBODIMENTS (Embodiment 1)

Figure 1:
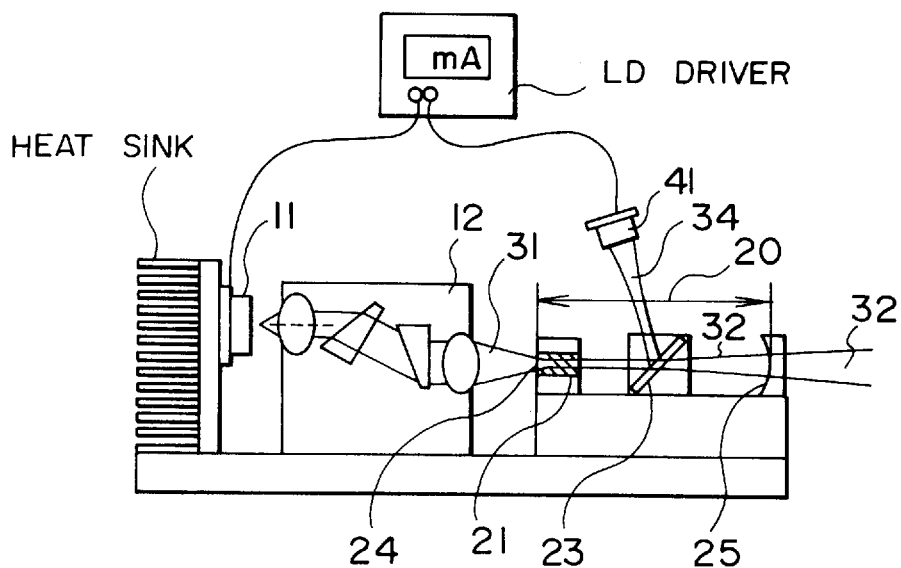
FIG. 1 is a diagram for explaining an embodiment of the present invention.

FIG. 1 is a diagram for explaining an embodiment of the present invention. An excitation beam 31 radiated from a semiconductor laser 11 is converged by converging optics 12 to excite a laser crystal 21. An AlGaInP semiconductor laser manufactured by Spectra Diode Laboratory Co. which has an output of 500 mW and an oscillation wavelength of 670 nm is used as the semiconductor laser 11. The converging optics 2 consist of a semiconductor laser collimator (f=8 mm), an anamorphic prism pair (magnification; 6X) and a single lens (f=30 mm). Any focusing distance and the like of the converging optics are acceptable as far as they do not greatly reduce efficiency. An optical fiber or cylindrical lens may be used as beam shaping means.

The excited laser crystal 21 oscillates a first laser beam 32 in a resonator 20 which comprises an input mirror 24 formed on the end surface of the laser crystal and an output mirror 25. The laser crystal 21 and a birefringence filter 23 as a wavelength control element are arranged in the resonator 20. The wavelength of the first laser beam 32 oscillated in the resonator is controlled by the birefringence filter 23 as a wavelength control element. The resonator structure 20 is a plane-concave type resonator, the curvature radius of the output mirror 25 is 150 mm, and the effective optical path length is slightly shorter than the curvature radius. Any resonator structure 20, curvature radius and effective optical path length are acceptable as far as they do not greatly reduce efficiency.

An LiSAF crystal (φ3×5 mm) containing 1.5 mol% of Cr is used as the laser crystal 21. To the front end surface of the crystal are applied an anti-reflection (to be abbreviated as AR hereinafter) coating having a reflectance of 2% or less for the wavelength of excitation light and a high reflection (to be abbreviated as HR hereinafter) coating having a reflectance of 99% or more for the wavelength of the first laser beam to form the input mirror 24. The reflectance of the HR coating may be 95% or more and needs not to be 99% or more. To the rear end surface of the crystal is applied an AR coating having a reflectance of 2% or less for the wavelength of the first laser beam. To the output mirror 25 is applied an HR coating having a reflectance of 99% or more for the first laser beam. The birefringence filter 23 made of a quartz plate is used as a wavelength control element and inclined at an Brewster Angle with respect to the first laser beam 32. Thereby, the birefringence filter 23 can turn around the optical axis to control the wavelength of the first laser beam 32. The wavelength control range is set to about 860±50 nm and the wavelength selection width to about 0.5 nm. In this respect, the wavelength control width can be changed by laminating together quartz plates whose thicknesses differ by a factor of multiples of an integer. Any wavelength control width is acceptable as far as the output of the first laser beam does not decrease significantly. A prism or etalon may be used in place of the wavelength control element 23.

The first laser beam which has been partly reflected and separated by the birefringence filter 23 as a wavelength control element reaches a detector 41 as a sample beam 34. A reference value for the intensity of a certain sample beam is set as a reference voltage and the drive current of the semiconductor laser 11 is adjusted by an LD driver so that the output voltage of the detector 41 becomes equal to this reference voltage.

Owing to such constitution, stable laser output can be obtained.

The absorption wavelength allowable range of the LiSAF crystal 21 is wide at about 100 nm. Although the wavelength of the semiconductor laser for excitation was not controlled by using a temperature control element, it may be controlled to match the wavelength with the maximum absorption wavelength.

(Embodiment 2)

Figure 2:
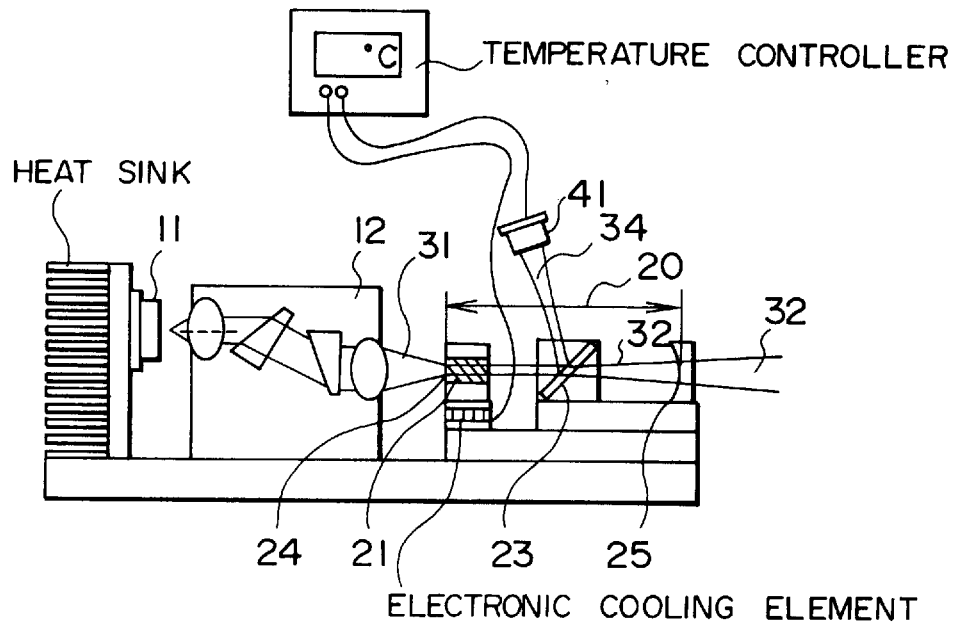
FIG. 2 is a diagram for explaining another embodiment of the present invention.

FIG. 2 is a diagram for explaining another embodiment of the present invention. The semiconductor laser 11, the converging optics 12, the resonator structure and the wavelength control element 23 are the same as those of Embodiment 1.

Like Embodiment 1, feed-back control is made possible by using as a sample beam 34 the first laser beam which is separated from the resonator 20 by the birefringence filter 23 as a wavelength control element. The first laser beam which has been partly reflected and separated by the wavelength control means based on this reaches a detector 41 as a sample beam 34. A reference value for the intensity of a certain sample beam is set as a reference voltage and the temperature of the LiSAF crystal 21 is adjusted so that the output voltage of the detector 41 becomes equal to this reference voltage.

Owing to such constitution, stable laser output can be obtained.

(Embodiment 3)

Figure 3:
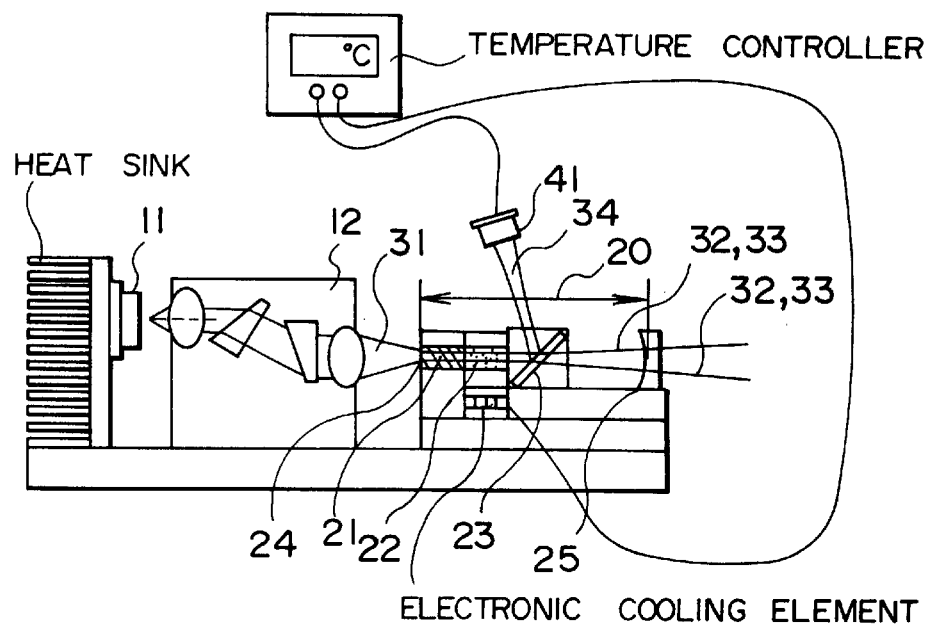
FIG. 3 is a diagram for explaining still another embodiment of the present invention.

FIG. 3 is a diagram for explaining another embodiment of the present invention. The excitation optics including the semiconductor laser 11 are the same as those of Embodiment 1.

The excited laser crystal 21 generates the first laser beam 32 which is a solid laser oscillation wave in the resonator 20 which comprises the input mirror 24 formed on the end surface of the laser crystal and the output mirror 25. In the resonator 20, the laser crystal 21, a nonlinear optical crystal 22 and the birefringence filter 23 as a wavelength control element are arranged. An $LiB_3O_5$ crystal (lithium phosphate, to be referred to as "LBO crystal" hereinafter) is used as the nonlinear optical crystal 22, measures 3×3×5mm and is applied an AR coating having a reflectance of 2 % or less for the wavelength of the first laser beam and the wavelength of an SH wave. The LBO crystal which is the nonlinear optical crystal 22 is kept at 25°±0.1° C. using an electron cooling element. To the output mirror 25 are applied an HR coating having a reflectance of 99% or more for the first laser beam and an AR coating for the SH wave 33 and an opening of φ10 mm is formed therein like Embodiment 1. Other optical parts are the same as those of Embodiment 1. The wavelength of the first laser beam oscillated in the resonator 20 is controlled by the birefringence filter 23 as a wavelength control element to a wavelength at which the wavelength conversion efficiency of the nonlinear optical crystal 22 becomes maximal. Part of the first laser beam 32 is converted into a second harmonic wave (SH wave) by the nonlinear optical crystal 22 and about 20% of the SH wave is separated from the optical axis by the birefringence filter 23 as a wavelength control element and radiated from the output mirror 25. About 20% of the SH wave which has been separated by the birefringence filter 23 as a wavelength control element is used as a sample beam 34 for feed-back control. A reference value for the intensity of a certain sample beam is set as a reference voltage and the temperature of the nonlinear optical crystal 22 is adjusted so that the output voltage of the detector 41 becomes equal to this reference voltage. The above-described drive current of the semiconductor laser 11 or the temperature of the LiSAF crystal 21 may be adjusted in place of the temperature of the nonlinear optical crystal 22.

The wavelength control range of the birefringence filter 23 as a wavelength control element is set to about 860±70 nm and the wavelength selection width to 0.5 nm. In this respect, the wavelength control range can be adjusted nearly to a wavelength at which the conversion efficiency of the LBO crystal as the nonlinear optical crystal 22 becomes maximal and any wavelength selection width is acceptable as far as the SH output 33 does not decrease significantly. Owing to this wavelength control, a blue SH wave having a wavelength of 430 nm can be obtained stably from the LBO crystal which is the nonlinear optical crystal 22.

A $KNbO_3$ (potassium niobate), K-L-N (potassium lithium niobate), $\beta$-$BaB_2O_4$ (barium borate), $LiIO_3$ (lithium iodate) may be used in place of the LBO crystal as the nonlinear optical crystal 22. When one of them is used, it is necessary to control the wavelength to a wavelength selection width suitable for the wavelength dependence of the SHG conversion efficiency of the nonlinear optical crystal 22 in use.

(Embodiment 4)

Figure 4:
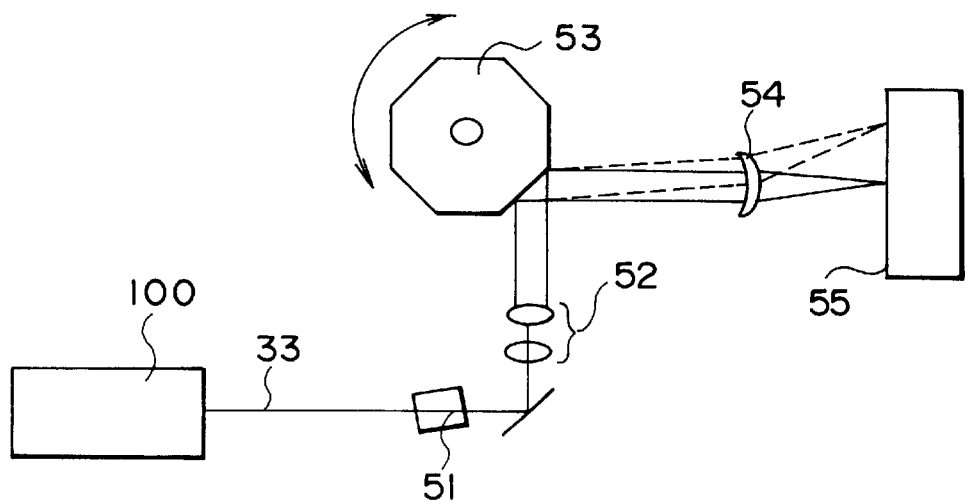
FIG. 4 is a diagram for explaining a further embodiment of the present invention.

FIG. 4 is a diagram for explaining a laser printer according to a further embodiment of the present invention. Blue laser output 33 radiated from a blue laser light source 100 illustrated in FIG. 3 passes through an acousto-optical (to be abbreviated as AO hereinafter) modulator 51, a beam expander 52, a rotary polygon mirror 53 and an fθ lens 54, and is converged upon a photosensitive drum 55. The AO modulator 51 modulates the SHG output 43 according to image information, and the rotary polygon mirror 53 scans in a horizontal direction (of the paper of the drawing). With this combination, two-dimensional information is recorded on the photosensitive drum 55 as partial potential differences. The photosensitive drum 55 turns, adhered by toner according to the potential differences, and reproduces information on recording paper.

A photosensitive material applied to the photosensitive drum 55 is selenium (Se) and the blue laser light source 100 has an output wavelength of 420 nm to which the photosensitive material is relatively highly sensitive and an output of 15 mW.

(Embodiment 5)

Figure 5:
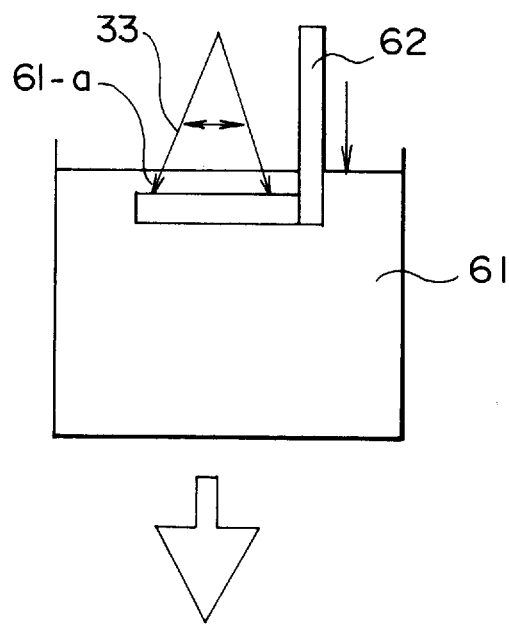
FIG. 5 is a diagram for explaining a still further embodiment of the present invention.
Figure 5:
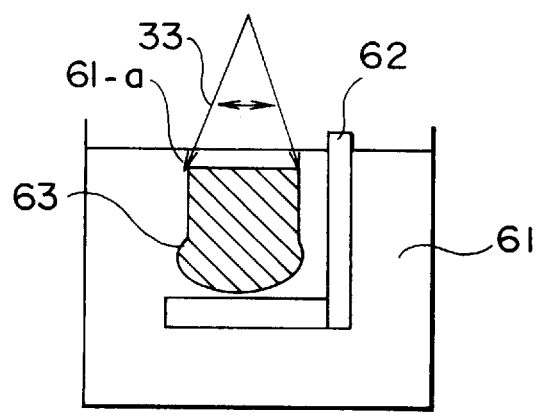

FIG. 5 is a diagram for explaining an optical shaping unit according to a still further embodiment of the present invention. The blue laser light source 100 illustrated in FIG. 3 is used as a light source. A blue curing resin 61 is charged into a container and a laser beam 33 is caused to scan the surface of a liquid two-dimensionally. At this point, only a surface portion 61-a of the blue curing resin 61 that absorbs light cures. After the formation of one layer is completed, an elevator 62 falls to form the next layer continuously. With this operation, a solid model 63 having a desired shape can be formed. At this point, the blue laser light source has a wavelength of 430 nm and an output of 30 mW.

(Embodiment 6)

Figure 6:
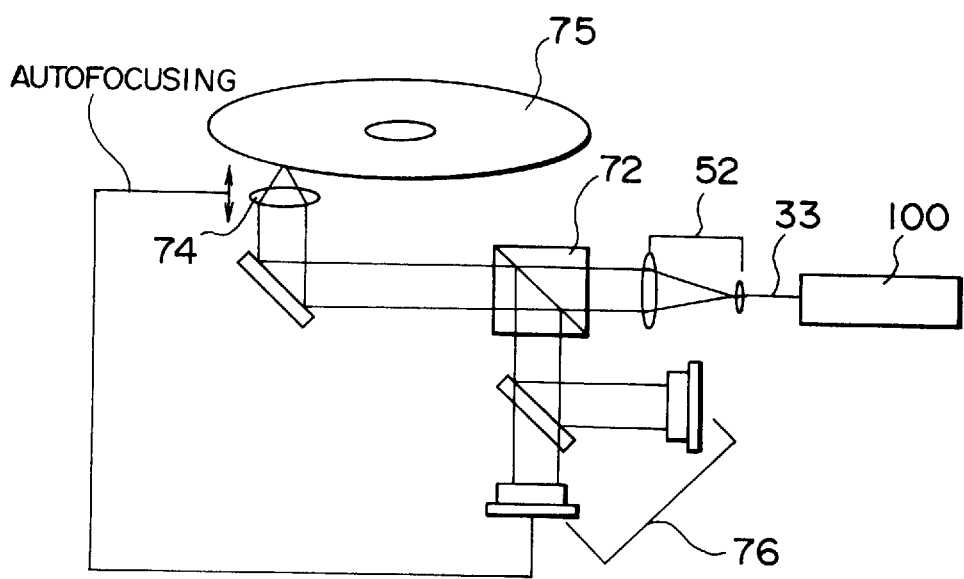
FIG. 6 is a diagram for explaining a still further embodiment of the present invention.

FIG. 6 is a diagram for explaining an optical disk drive according to another embodiment of the present invention. The blue laser light source 100 illustrated in FIG. 3 is used as a light source. The optical disk drive employs opto-magneto recording system. Blue laser output 33 radiated from the blue laser light source 100 is expanded by the beam expander 52 and then becomes parallel beams. The beams passing through the beam splitter 72 are converged upon a medium 75 by a converging optic 74. Reflected light is partially reflected by the beam splitter 72 and divided by the beam splitter 72 into two beams which are then received by two detectors 76. The two detectors after the beam splitter 72 perform autofocusing and signal detection.

A fixed magnetic field is applied to the medium 75, and the focusing temperature is raised to a Curie temperature of the medium 75 by blue laser output to reverse magnetization for recording. When the laser beam is on, the magnetization of the medium is reversed, and when the laser beam is off, the magnetization is not reversed, enabling signal recording. The recording frequency is set to 10 MHz. At the time of signal reproduction, the same blue laser light source 100 as that used for recording is used to obtain a well reproduced signal.

The present invention proposes means for stabilizing laser output without generating a new loss in an LiSAF laser and a wavelength conversion laser such as an SHG using an LiSAF laser. The present invention makes it possible to obtain stable laser output and improve the reliability of a laser. The present invention also makes it possible to reduce the number of parts for separating a beam.

In a laser using a wavelength variable laser crystal, means for stabilizing laser output can be obtained without generating a new loss.

While preferred embodiments of the invention have been described, it is to be understood that the invention is not limited thereto but may be otherwise variously embodied within the scope of the following claims.

What is claimed is:

1. A laser comprising:
   an excitation element;
   a resonator including:
   a wavelength variable laser crystal containing a fluoride, the laser crystal being excited by said excitation element to produce a laser beam; and
   an optical part to receive the laser beam, reflect a sample beam, control the wavelength of the laser beam and output the laser beam;
   a detector to quantitize the sample beam; and
   a stabilization unit connected to the detector to stabilize the laser beam output by the resonator based on the quantitization by the detector.

2. A laser according to claim 1, wherein the laser crystal is Cr: LiSrAlF$_6$ (chromium added lithium strontium aluminum fluoride).

3. A laser according to claim 1, wherein the optical part has a birefringence effect.

4. A laser according to claim 1, wherein the excitation element is a semiconductor laser.

5. A laser according to claim 1, further comprising:
   a photosensitive drum;
   a scanning mechanism connected to the resonator to receive the stabilized laser beam and to selectively scan the stabilized laser beam over the photosensitive drum.

6. A laser according to claim 1, further comprising:
   a resin; and
   a scanning apparatus connected to the resonator to receive the stabilized laser beam and to selectively scan the resin.

7. A laser according to claim 1, further comprising:
   a magnetic recording medium; and
   a recording mechanism connected to the resonator to receive the stabilized laser beam, to selectively focus the stabilized laser beam on the magnetic recording medium and to selectively increase the temperature of the magnetic recording medium.

8. A laser comprising:
   an excitation element;
   a resonator including:
   a wavelength variable laser crystal containing a fluoride, the laser crystal being excited by said excitation element to produce a first laser beam having a first wavelength;
   a nonlinear optical element to receive and oscillate the first laser beam, convert the first wavelength and produce a second laser beam having a second wavelength different from the first wavelength;
   an optical part to receive the second laser beam, reflect a sample beam, control the wavelength of the second laser beam and output the second laser beam;
   a detector to quantitize the sample beam; and
   a stabilization unit connected to the detector to stabilize the second laser beam output by the resonator based on the quantitization by the detector.

9. A laser according to claim 8, wherein the stabilization unit varies the excitation of the excitation element according to quantitized variations in the sample beam.

10. A laser according to claim 8, wherein
    a nonlinear optical crystal serves as the nonlinear optical element, and the stabilization unit varies the temperature of the laser crystal or the nonlinear optical crystal according to quantitized variations in the sample beam.

11. A laser according to claim 8, wherein
    the second wavelength of the second laser beam oscillates and has an oscillation wavelength width $\Delta\lambda_1$, and
    the stabilization unit stabilizes the oscillation wavelength width $\Delta\lambda_1$ to 0.01 nm $\leq \Delta\lambda_1 \leq 1$ nm.

12. A laser according to claim 8, wherein the laser crystal is Cr: LiSrALF$_6$ (chromium added lithium strontium aluminum fluoride).

13. A laser according to claim 8, wherein the optical part has a birefringence effect.

14. A laser according to claim 8, wherein the excitation element is a semiconductor laser.

15. A laser comprising:
    a variable semiconductor laser producing a variable excitation light;
    a resonator including:
    a laser crystal made of Cr: LiSrAlF$_6$, the laser crystal being excited by the excitation light to produce a first laser beam having a wavelength ($\lambda 1$) of 780 nm $\leq \lambda 1 \leq 1,000$ nm;
    a nonlinear optical element to receive and oscillate the first laser beam, convert the wavelength ($\lambda 1$) of the first laser beam and produce a second laser beam having a wavelength ($\lambda 2$) of 390 nm $\leq \lambda 2 \leq 500$ nm;
    a birefringence filter to receive the second laser beam, reflect a sample beam, control the wavelength of the second laser beam and output the second laser beam;
    a detector to determine the output of the sample beam; and
    a stabilization unit connected to the detector to stabilize the second laser beam output by the resonator by varying the excitation light, according to variations in the output of the sample beam.

16. A laser according to claim 15, further comprising:
    a photosensitive drum; and
    a scanning mechanism connected to the resonator to receive the stabilized second laser beam and to selectively scan the stabilized second laser beam over the photosensitive drum.

17. A laser according to claim 15, further comprising:
    a resin; and
    a scanning apparatus connected to the resonator to receive the stabilized second laser beam and to selectively scan the resin.

18. A laser according to claim 15, further comprising:

a magnetic recording medium; and a recorder mechanism connected to the resonator to receive the stabilized second laser beam, to selectively focus the stabilized second laser beam on the magnetic recording medium and to selectively increase the temperature of the magnetic recording medium.

19. A laser comprising:

an excitation element emitting an excitation light;

a resonator including:

a wavelength variable laser crystal containing a fluoride, the laser crystal being excited by said excitation light to produce a laser beam; and birefringent filter located in the path of the laser beam from the laser crystal, the birefringent filter being inclined with respect to the laser beam to reflect a portion of the laser beam as a sample beam and to pass a portion of the laser beam through the resonator such that the portion passed through the resonator has a controlled wavelength;

a detector to determine the intensity of the sample beam; and a stabilization unit connected to the detector to stabilize the laser beam output by the resonator based on the intensity of the sample beam.

* * * * *

UNITED STATES PATENT AND TRADEMARK OFFICE
CERTIFICATE OF CORRECTION

PATENT NO.:     5,825,793           Page 1 of 2
DATED      :    October 20, 1998
INVENTOR(S):    Tsuyoshi Miyai, et al.

Figure 7:
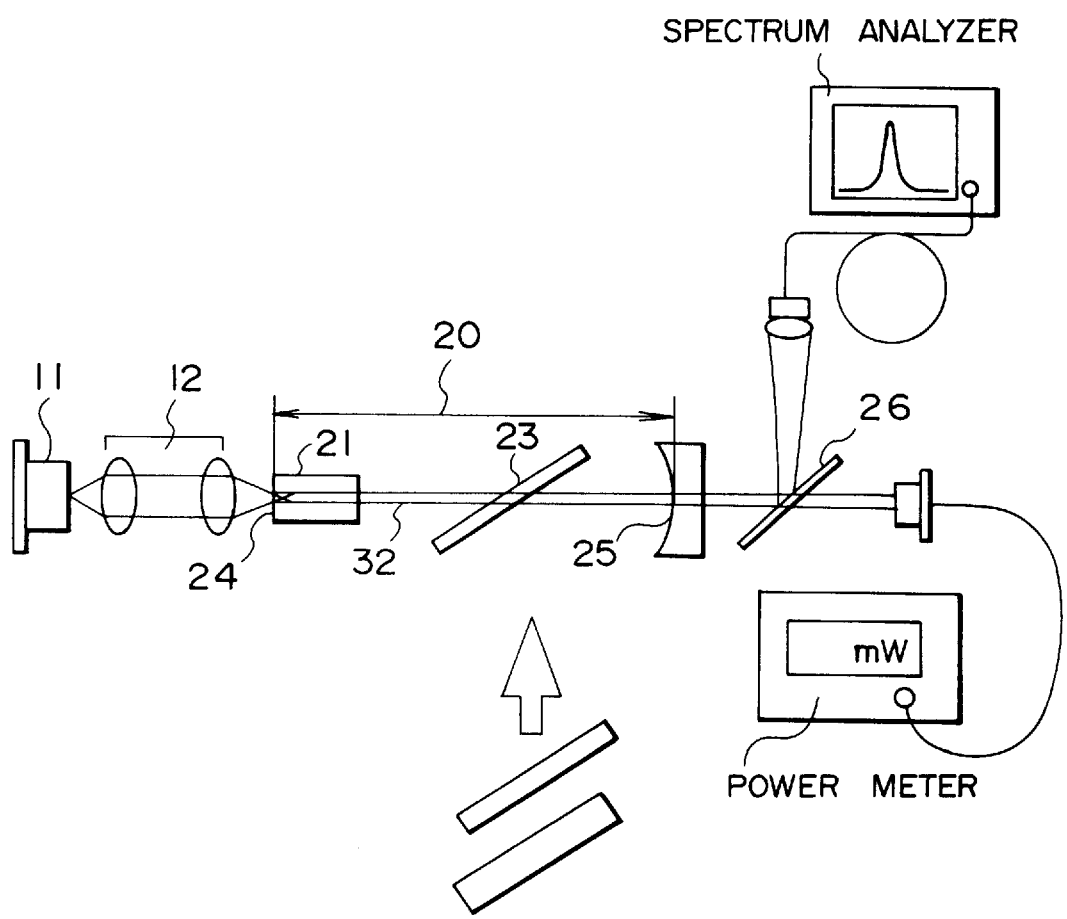
FIG. 7 is a diagram for explaining means for measuring the relationship between the bandwidth of the longitudinal mode of an LiSAF laser and the power of the oscillation beam of the LiSAF laser.
Figure 8:
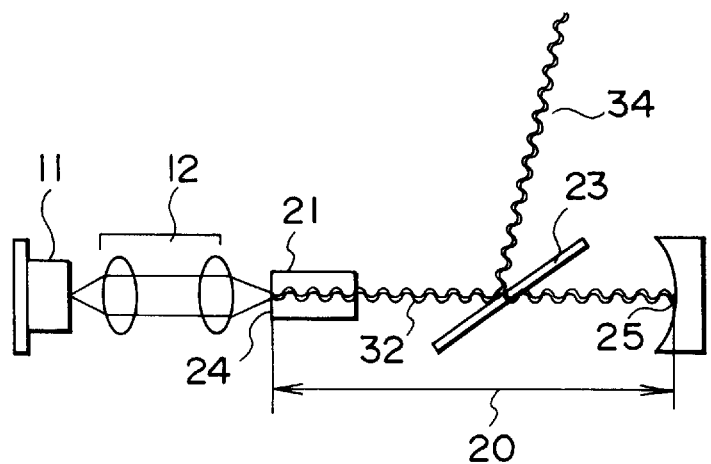
FIG. 8 is a diagram for explaining how to obtain a sample beam used for feed-back control.
Figure 9:
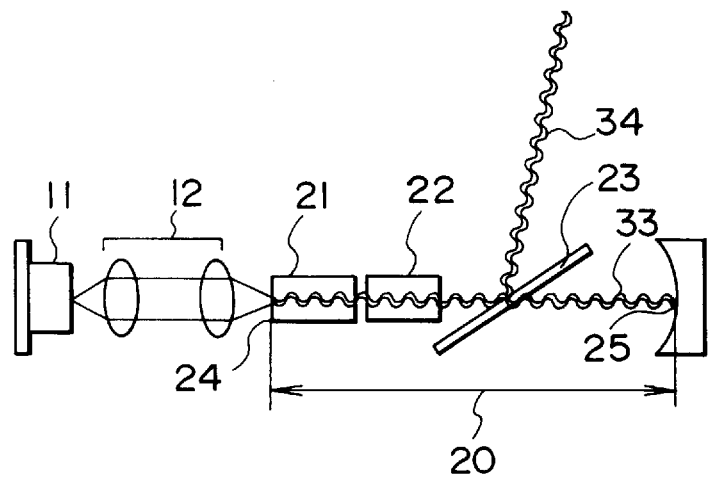
FIG. 9 is a diagram for explaining how to obtain a sample beam used for feed-back control.
Figure 10:
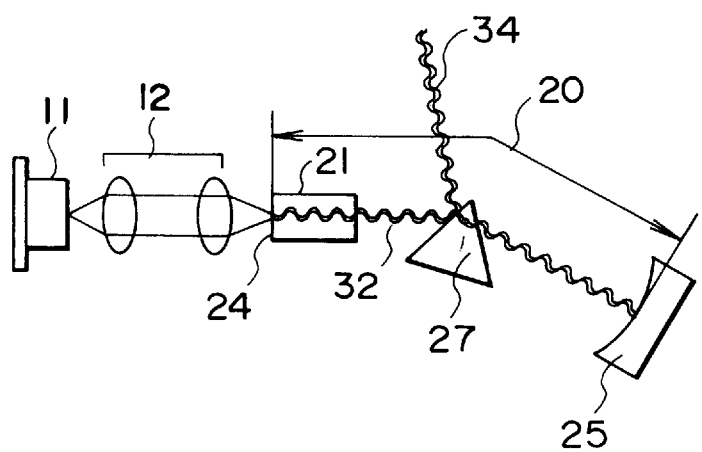
FIG. 10 is a diagram for explaining how to obtain a sample beam used for feed-back control.
Figure 7:
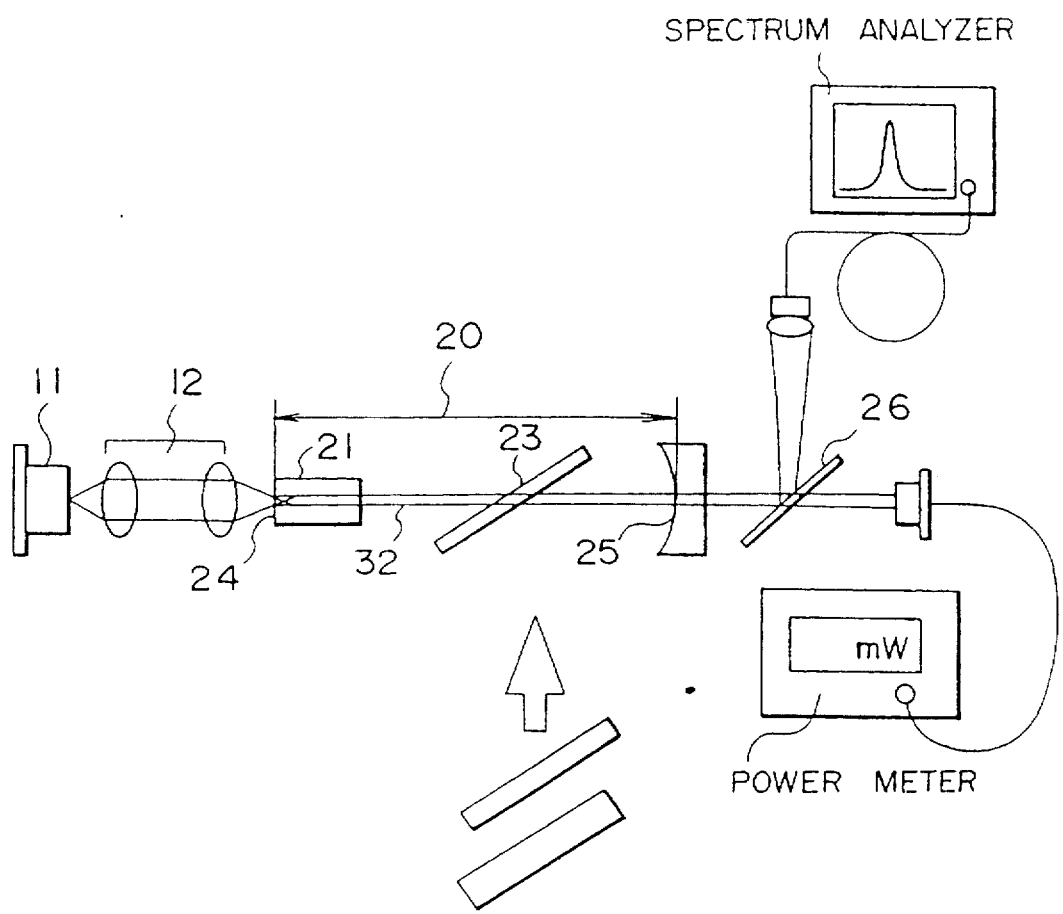

It is certified that error appears in the above-identified patent and that said Letters Patent is hereby corrected as shown below:

Abstract,   [57] change "having," to --having--;

In the Drawings, REPLACE FIG. 7 as attached.

Signed and Sealed this

Twenty-eighth Day of December, 1999

Q. TODD DICKINSON

Attest:

Attesting Officer        Acting Commissioner of Patents and Trademarks